Patented July 28, 1931

1,815,990

UNITED STATES PATENT OFFICE

CONRAD SCHOELLER, OF MANNHEIM, GERMANY, ASSIGNOR TO GENERAL ANILINE WORKS, INC., OF NEW YORK, N. Y., A CORPORATION OF DELAWARE

DYEING AND PRINTING NATURAL FIBER WITH SULPHUR AND VAT DYESTUFFS

No Drawing. Application filed October 31, 1928, Serial No. 316,341, and in Germany December 13, 1926.

Hitherto, while it has been possible to dye wool and cotton themselves with dyestuffs of fairly good or very good fastness, for dyeing half wool it has only been possible to employ substantive and acid dyestuffs of small fastness, frequently even by the employment of a two-bath process. Sulphur and vat dyestuffs with few exceptions could not be employed due to the strongly alkaline dye liquors necessary.

I have now found that solutions or vats as well as printing pastes of sulphur and vat dyestuffs which are suitable for dyeing and printing wool, half wool, and the like, may be prepared by replacing the alkali, which would attack the wool and the like, by aliphatic, aromatic, or hydroaromatic amines or heterocyclic bases having an alkaline reaction, which are not injurious to animal fibers, in combination with hydrosulfite or other reducing agents, and also in cases where dyeing is carried out at more elevated temperatures than those usually employed, for instance at temperatures near or at the boiling point of the vat, such as for example with sulphur dyestuffs, by adding formaldehyde in order to maintain the excess hydrosulfite in an active condition during the dyeing process.

In accordance with the process of this invention deep uniform dyeings having good properties of fastness are obtained, for example, with sulphur dyestuffs on half wool; similarly with vat dyestuffs deep dyeings are obtained on wool without injury to the fiber.

The following, among others of the said amines and heterocyclic bases, have proved particularly suitable:—triethanolamine, cyclohexyldiethanolamine, cyclohexylmonoethanolamine, pyridine.

The following examples will further illustrate how the invention may be carried into practical effect but the invention is not restricted to these examples.

Example 1

0.8 part of 100 per cent triethanolamine, 0.6 part of the sulphur dyestuff free from alkali obtained by boiling 1.2.4 dinitrophenol with sodium polysulfide (Colour Index 1924, No. 978), or 0.8 part of solid hydrosulfite and 0.3 part of a 30 per cent solution of formaldehyde are added to 100 parts of water and the whole warmed at 70° C. for 5 to 10 minutes. 100 parts of water and 3 parts of Glauber's salt (sodium sulfate) are then added and 10 parts of half wool serge introduced into the dye liquor. The whole is then heated at between 80° and 90° C. for an hour with good working; the serge is then squeezed out and allowed to hang for 15 minutes, rinsed and soaped for 10 minutes at 35° C. with a solution of 2 grams of soap per liter.

A well covered, equal black dyeing, fast to rubbing is obtained; the wool is not appreciably influenced, much less so than for example by said dyeing with chromium dyestuffs.

The quantities of triethanolamine, Glauber's salt (sodium sulfate) hydrosulfite and formaldehyde (which may be replaced by formaldehyde-sodium-sulfoxylate) may be varied as also the temperature. Instead of formaldehyde other substances which combine with hydrosulfite, or glucose may be added.

Example 2

The process according to Example 1 is followed, the ingredients of the dye bath are as follows:—100 parts of water, 2 parts of pyridine, 0.8 part of the sulphur dyestuff described in Example 1, 0.5 part of solid hydrosulfite, 0.1 part of formaldehyde, 1 part of formaldehyde-sodium-sulfoxylate and then 4 parts of Glauber's salt and 100 parts of water.

Handsome black dyeings are obtained.

Example 3

4 parts of cyclohexylmonoethanolamine (75 per cent), 0.6 part of solid hydrosulfite and 0.5 part of dimethoxydibenzanthrone are added to 200 parts of water at 60° to 70° C., and after 10 minutes at this temperature 5 parts of wool yarn are introduced and dyed for 1 hour without movement. The yarn is then rinsed, oxidized, acidified with a solution containing 1 cubic centimeter of sulfuric acid of 66° Baumé per liter of water, rinsed and soaped for one quarter of an hour at 45° C. with a solution of 4 grams of soap per liter.

A deep bright green dyeing is obtained, without injury to the wool.

Although the dyestuff may be quite well reduced by a much smaller quantity of amine, large quantities are preferable in order to prevent separation of the dyestuff during dyeing.

*Example 4*

0.2 part of cyclohexylmonoethanolamine (75 per cent), 0.1 part of size glue, 0.2 part of solid hydrosulfite and 0.2 part of the dry leuco compound of the dyestuff obtainable by heating the condensation product of chloranil and aniline with ethyl alcohol, saturated with hydrogen sulphide, at a temperature of between 120 and 125° C. are added to 200 parts of water and warmed for 10 minutes at 50° C., 5 parts of wool yarn are then introduced into the dye liquor and dyed for an hour at 50° C. without movement and finished as in Example 3.

The yarn is soaped for 10 minutes at 30° C. with a solution of 2 grams of soap per liter.

*Example 5*

400 parts of water are warmed for 10 minutes at 50° C. with 0.4 part of cyclohexylmonoethanolamine, 0.2 part of size glue, 0.8 part of solid hydrosulfite and 0.2 part of the dyestuff mentioned in Example 4; 5 parts of wool yarn are introduced and dyed for half an hour at this temperature without stirring; 1.5 parts of a 10 per cent ammonium sulfate solution are then added in small quantities and finally acetic acid until the bath is exhausted. The yarn is rinsed and soaped as in Example 4. Dyeings in no way inferior to those obtained by the usual method with employment of ammonia are obtained, and moreover the material is not injured.

*Example 6*

Wool muslin is treated with chlorine in the manner customary for printing purposes, and printed with the following printing mixture:—

50 grams of the sulphur dyestuff described in Example 1
80 grams of glycerine
70 grams of water
200 grams of alkaline paste (see below)
400 grams of British gum. 1 to 1.
100 grams of grape sugar (dextrose)
50 grams of formaldehyde-sodium-sulfoxylate
50 grams of water 1000 grams The alkaline paste is prepared by making 20 grams of wheat starch
50 grams of water
50 grams of dark burnt starch
150 grams of water into a paste, cooling the whole, then adding
10 grams of glycerine 400 grams of cyclohexyldiethanolamine, heating to 70° C. and stirring until cold. The printed material is dried, steamed for 3 minutes in a Mather-Platt, well rinsed and soaped for 15 minutes at 35° C. with a solution of 2 grams of soap per liter. Deep shades fast to rubbing are obtained without damaging the wool.

What I claim is:—

1. In the dyeing and printing of natural fibers as well as mixed textures thereof with vat and sulphur dyestuffs the step which comprises solubilizing the said dyestuffs, instead of by alkalies, by an organic base together with a reducing agent.

2. In the dyeing and printing of natural fibers as well as mixed textures thereof with vat and sulphur dyestuffs the step which comprises solubilizing the said dyestuffs, instead of by alkalies, by an organic base together with hydrosulfite.

3. In the dyeing and printing of natural fibers as well as mixed textures thereof with vat and sulphur dyestuffs the step which comprises solubilizing the said dyestuffs at higher temperatures than those usually applied for dyeing, instead of by alkalies, by an organic base together with a reducing agent and formaldehyde.

In testimony whereof I have hereunto set my hand.

CONRAD SCHOELLER.